United States Patent
Fischer

(10) Patent No.: US 6,546,637 B2
(45) Date of Patent: Apr. 15, 2003

(54) LEVELING INSTRUMENT—CLAMPING DEVICE

(75) Inventor: Walter Fischer, Dornstetten (DE)

(73) Assignee: Nestle & Fischer GmbH & Co. KG (DE)

( * ) Notice: Subject to any disclaimer, the term of this patent is extended or adjusted under 35 U.S.C. 154(b) by 50 days.

(21) Appl. No.: 09/813,204

(22) Filed: Mar. 20, 2001

(65) Prior Publication Data

US 2001/0025426 A1 Oct. 4, 2001

(30) Foreign Application Priority Data

Mar. 21, 2000 (DE) .................................. 200 05 240 U
Feb. 16, 2001 (DE) .................................. 201 02 699 U

(51) Int. Cl.[7] ............................................. G01C 15/00
(52) U.S. Cl. ..................... 33/290; 403/24; 403/322.1; 403/374.1
(58) Field of Search ..................... 33/290, 286; 403/24, 403/321, 322.1, 322.4, 335, 338, 373, 374.1, 374.5; 248/544, 682, 683, 686, 688, 689, 676, 677, 346.03

(56) References Cited

U.S. PATENT DOCUMENTS

| | | | | |
|---|---|---|---|---|
| 2,308,206 A | * | 1/1943 | Poland ......................... 33/290 |
| 4,691,444 A | * | 9/1987 | Capps .......................... 33/290 |
| 5,501,018 A | * | 3/1996 | Porter .......................... 33/290 |
| 5,897,269 A | * | 4/1999 | Ross et al. ................... 403/321 |
| 5,983,510 A | * | 11/1999 | Wu et al. ...................... 33/286 |
| 6,231,266 B1 | * | 5/2001 | Gott ............................ 403/338 |
| 6,260,971 B1 | * | 7/2001 | Cardellini ................... 248/689 |
| 6,357,959 B1 | * | 3/2002 | Halliar ..................... 403/374.1 |

OTHER PUBLICATIONS

VEB Verlag fur Bauwesen Berlin 1972, Prof. Dr.–Ing. Fritz Deumlich, pp. 106–109.

* cited by examiner

Primary Examiner—Christopher W. Fulton
(74) Attorney, Agent, or Firm—Bachman & LaPointe, P.C.

(57) ABSTRACT

Leveling instrument—clamping device for mounting leveling instruments to the tripod platform of a tripod. It is provided with a device plate which can be mounted to the bottom of the leveling system and with a stop provided on the upper side of the tripod platform, as well as a clamping device positioned at a distance from the stop with the device plate being mounted removable on the tripod platform via the stop and the clamping device. This allows a quick and secure mounting of leveling instruments by few operations.

11 Claims, 4 Drawing Sheets

LEVELING INSTRUMENT— CLAMPING DEVICE

BACKGROUND OF THE INVENTION

The present invention relates to a leveling instrument—clamping device for fixing leveling instruments on the tripod platform of a tripod.

In order to fix geodetic instruments, e.g., leveling devices, leveling lasers, or the like, they are fixed on the tripod platform by means of a retaining bolt provided with every standard tripod. Depending on the embodiment of the tripod, either the leveling instrument, having a standard thread on its bottom, must be bolted onto a fixed bolt on the tripod, e.g., a crank tripod, or be bolted to the tripod platform by a bolt which can pass through a central recess in said tripod platform. Both types of fixing are awkward in their handling since the threaded bore into which the bolts must be screwed in are covered during mounting by the leveling instrument and face downward. Since mounting and separating are performed several times per day the process of screwing in is unpractical and time consuming.

SUMMARY OF THE INVENTION

Therefore, the present invention is based on the object of suggesting a possibility to mount a leveling instrument mentioned at the outset quicker than previously.

This object is attained according to the invention by a leveling instrument—clamping device having the characteristics set out herein, including advantageous embodiments.

The leveling instrument—clamping device according to the invention is provided with a device plate, which can be mounted to the bottom of the leveling instrument. This can occur via bolting, clamping, or any other suitable means of a secure connection. Basically, the device plate can be embodied round, circular, or angular as well. When screwing the leveling instrument in it can be rotated such that the threaded opening is visible. The top of the tripod platform is provided with at least one stop and one clamping device positioned at a distance from said stop by which the device plate can be clamped to the stop. The stop and the clamping device as well can be connected to the tripod platform either directly or via a plate. In a connection by means of a plate said plate can either be more or less imbedded into a recess of the tripod platform or can be positioned on top thereof. For instance, the clamping device can be either a device stretched by a spring or a clamping lever. Thus ensuring a quick fastening of the leveling instrument to the tripod and a correspondingly quick separability. Basically, the stop can be embodied differently according to the embodiment of the device plate. Correspondingly, the clamping by the clamping device can occur at the lateral circumference as well as on the top of the device plate.

According to one embodiment, the leveling instrument—clamping device is provided with a base plate, which can be fastened on the tripod platform from below by means of a retaining bolt. The base plate is considerably more manageable than a leveling instrument and, therefore, it can be more easily connected to the retaining bolt before the leveling instrument is connected to the device plate. The base plate itself remains mounted to the tripod platform. It is also possible to imbed the base plate directly into the tripod platform and to connect it firmly.

For mounting the device plate to the leveling instrument said instrument is practically bolted into a threaded bore provided on the bottom of the leveling instrument. This can occur via a bolt or, preferably, via a threaded pin provided at the device plate.

According to a preferred embodiment the device plate is positioned in the open space between the stop and the clamping device and fixed to the circumference. This allows a simple construction of the device plate as well as the base plate, particularly when the stop is advantageously embodied by two pins protruding from the surface of the base plate.

In order to prevent that, in spite of the clamping of the device plate to the pins, the leveling instruments are able to shift upward, and the pins are preferably embodied tapering towards the base plate. Additionally, the device plate is correspondingly provided with a slope at its lateral circumference by which the device plate and the pins interlock.

According to another preferred embodiment the clamping device is embodied as a clamping lever pivotable around an axis perpendicular to the surface of the base plate so that the clamping of the device plate occurs in a plane parallel to the surface of the base plate. In order to achieve clamping between the clamping lever and the device plate the surfaces of the clamping lever and/or the device plate contacting one another are adjusted to one another. Preferably, the clamping lever is embodied as a lever.

Corresponding to the tapered pins, the clamping lever is also provided with a sloped area on its lateral circumference which corresponds to the slope on the circumference of the device plate and which interlocks with it during clamping.

By the leveling instrument—clamping device according to the invention for mounting leveling instruments, such as levelers, theodolites, instruments for measuring the distance and the angle (total stations) or leveling lasers, to a tripod, a quick and secure fixing of said instruments is achieved in a simple manner.

BRIEF DESCRIPTION OF THE DRAWINGS

In the following, the invention is explained in detail using an exemplary embodiment and the corresponding drawings. They show.

DETAILED DESCRIPTION OF PREFERRED EMBODIMENTS

Figure 1:
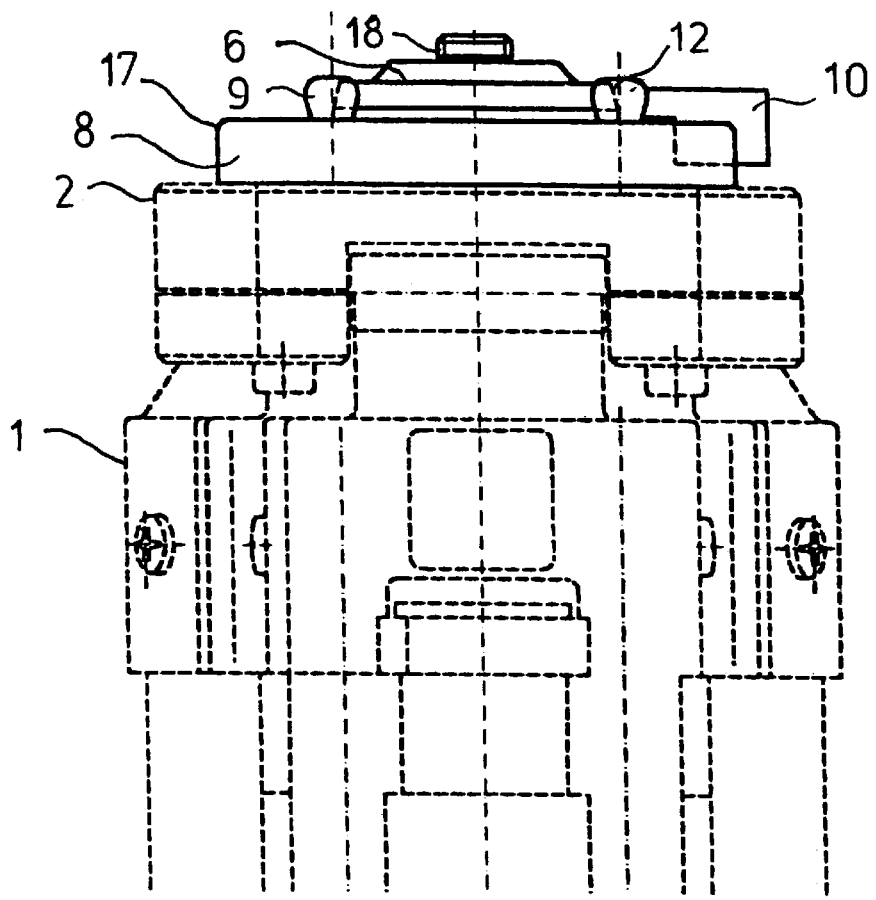
FIG. 1 a side view of the leveling instrument—clamping device on a tripod.
Figure 2:
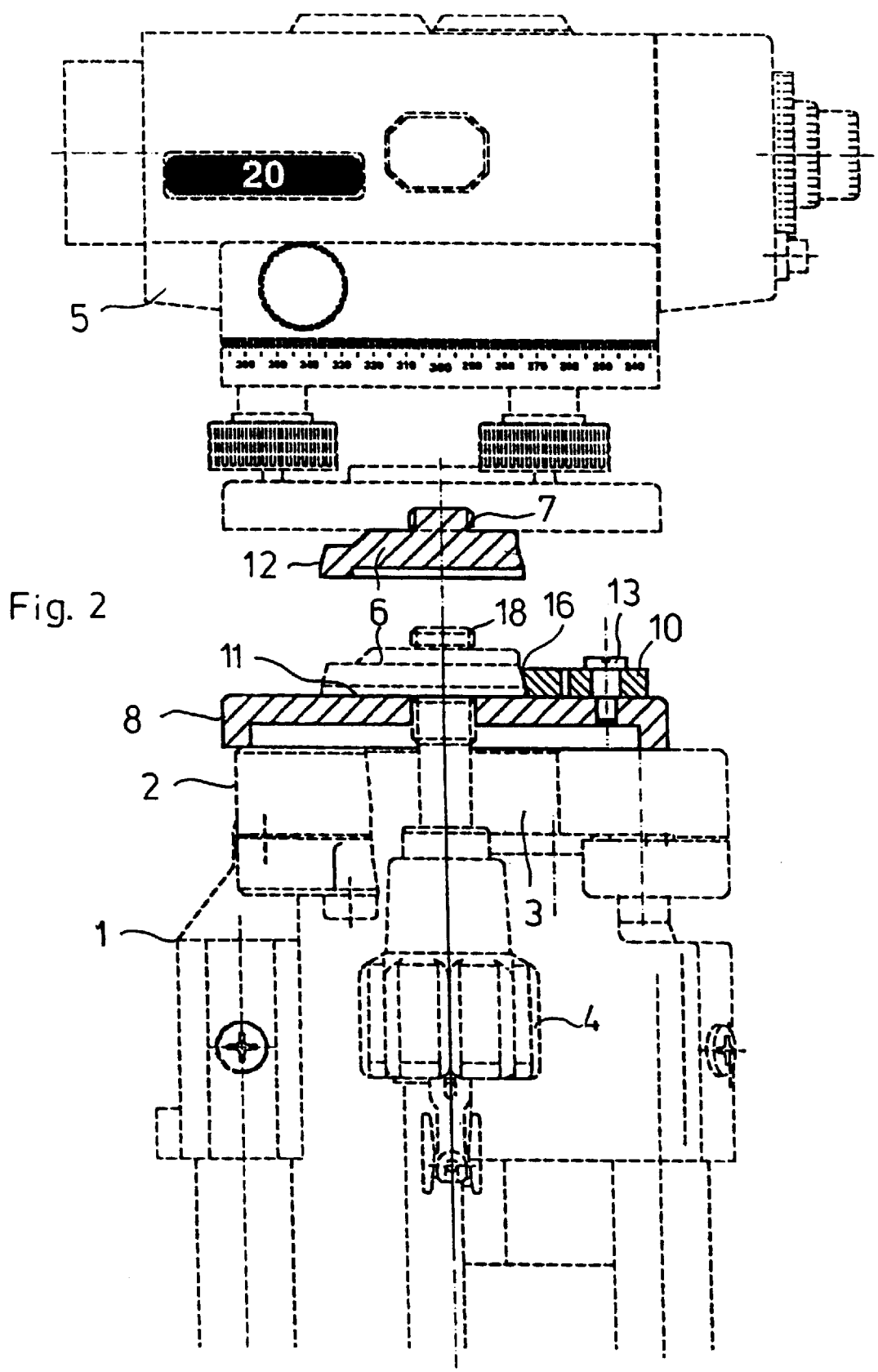
FIG. 2 a sectional view of a leveling instrument—clamping device and a leveling instrument in a separated state.

FIG. 1 shows the tripod 1 in dotted lines. The tripod 1 is provided with a tripod platform 2. In the exemplary embodiment a tripod was selected which is provided with a central recess 3 (FIG. 2) through which a retaining bolt 4 (FIG. 2) projects. On the tripod platform 2 a leveling instrument—clamping device 17 is provided having a base plate 8 with two tapering pins 9 protruding from its top. A device plate 6 contacts it with a threaded pin 18 for fastening to a leveling instrument 5 (FIG. 2). On its circumference, the device plate 6 is provided with a sloped area 12 by which it contacts the stop pins 9 conically tapering downwards. The clamping occurs by a clamping lever 10 pivotable around the vertical axis, its handle being discernible in this view.

From the sectional representation in FIG. 2 it is discernible how the clamping lever 10, embodied as a cam lever, is arranged on the base plate 8. The clamping lever 10 is also provided with a sloped area 16 by which it interlocks with the slope 12 at the device plate 6. In FIG. 2 the device plate 6 is shown screwed into the thread 7 at the leveling instrument 5. In dotted representation the device plate 6 is shown in its position on the base plate 8 in the open space 11 between the stop pins 9 (FIG. 1) and the clamping lever 10. In the exemplary embodiment the base plate 8 is provided with a U-shaped cross-section.

Figure 3:
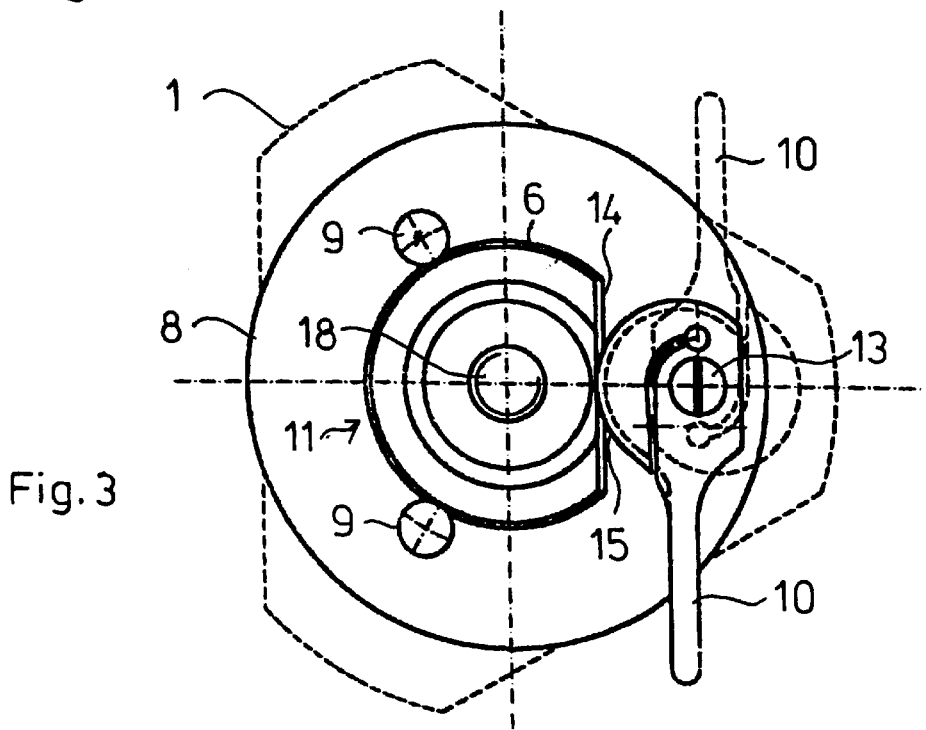
FIG. 3 a top view of the leveling instrument—clamping device.

In the top view in FIG. 3, the clamping is shown using the cam lever 10. Additionally, the cam lever 10 is shown in an open state in dotted representation. The cam lever is moved around the rotating pin 13 and presses with its circular shaped circumference 15 against the straight circumference 14 of the device plate 6. In the remaining area, the device plate 6 is embodied circularly so that a secure clamping of the device plate 6 to the base plate 8 is achieved in a simple manner by two stop pins 9.

Figure 4:
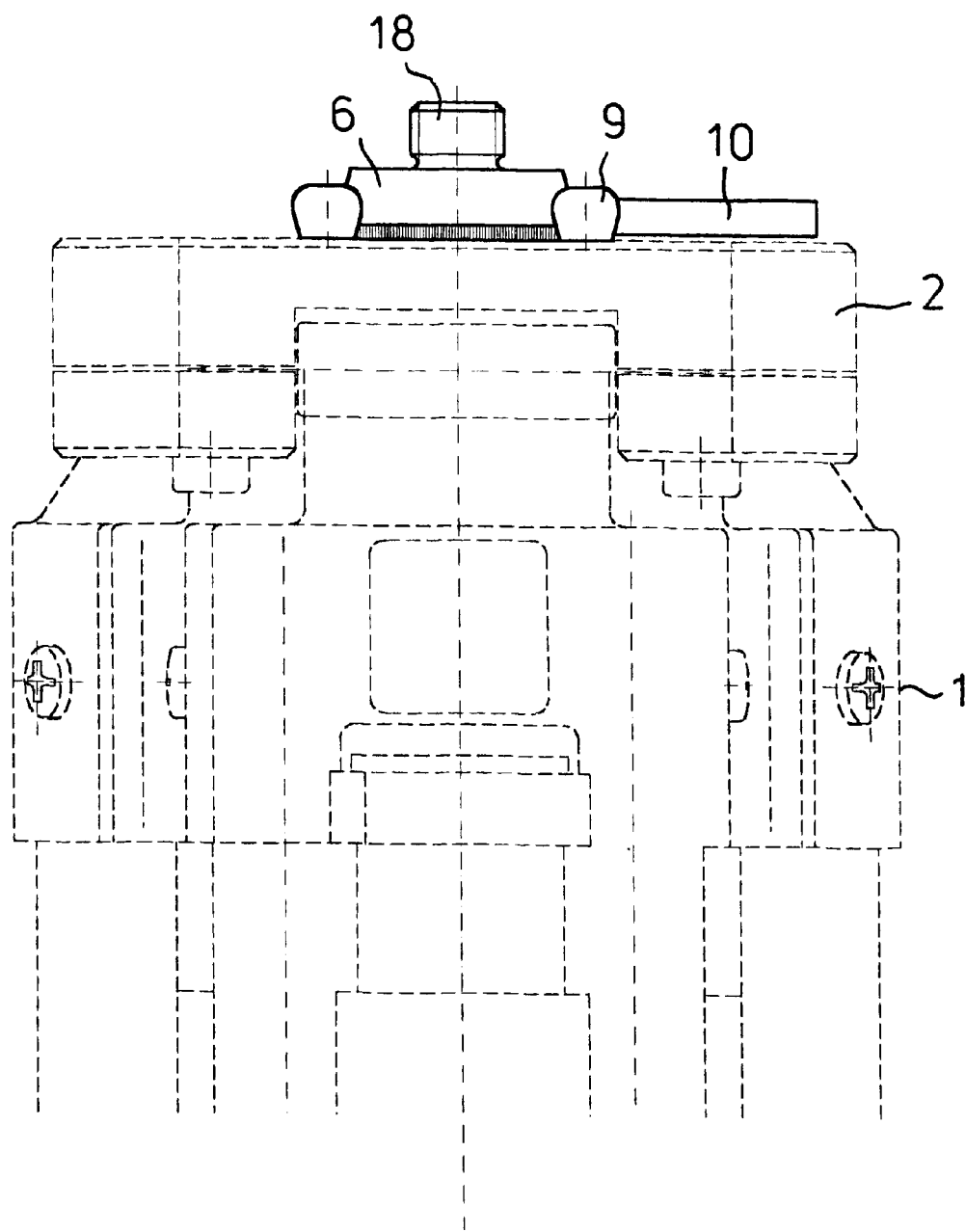
FIG. 4 a side view according to FIG. 1 of another leveling instrument—clamping device with the stop and the clamping device being integrated into the tripod platform.
Figure 5:
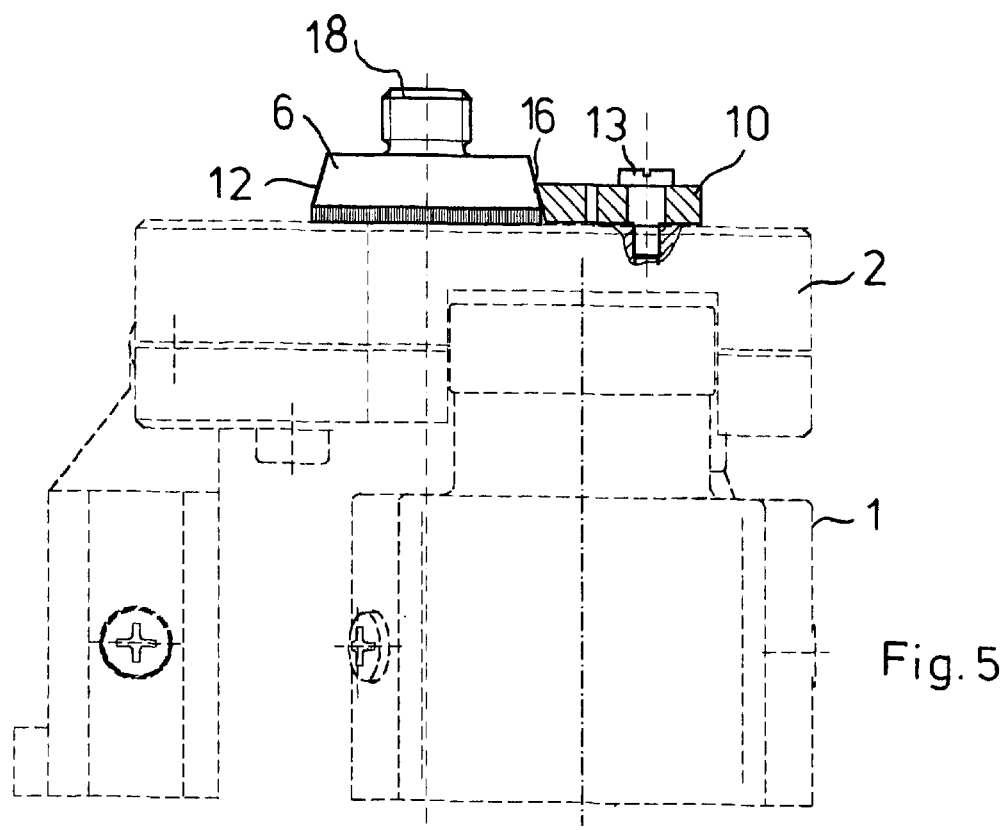
FIG. 5 a sectional representation according to FIG. 2 of the leveling instrument—clamping device according to FIG. 4.
Figure 6:
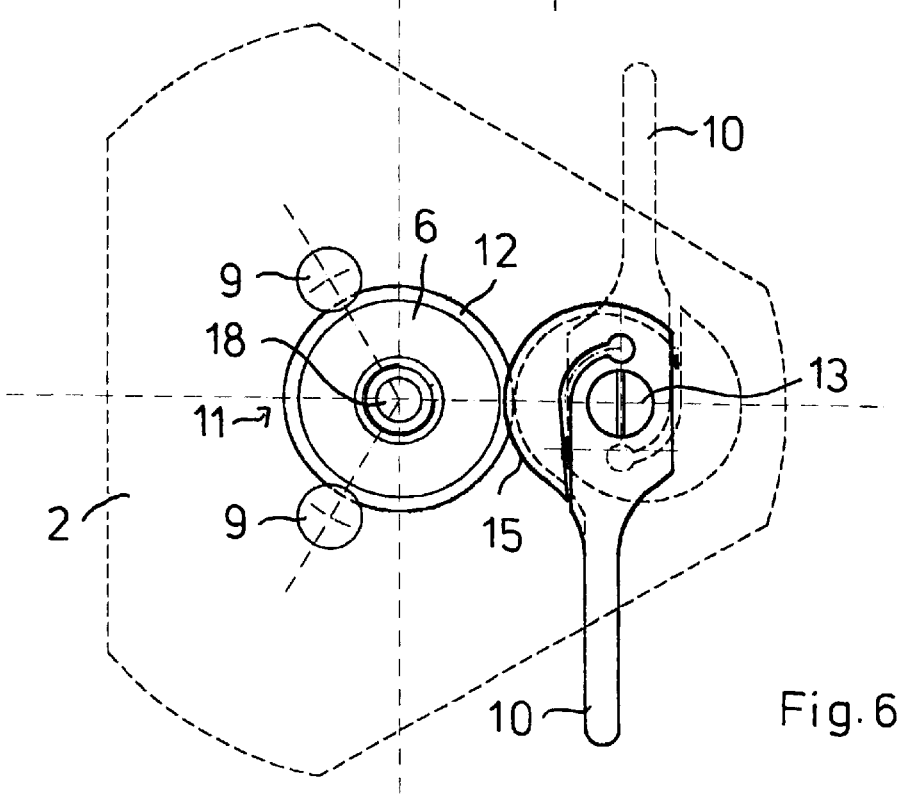
FIG. 6 a top view of a leveling instrument—clamping device according to FIG. 4.

In FIGS. 4 through 6 representations of a leveling instrument—clamping device are shown corresponding to FIGS. 1 through 3 in which the stop pins 9 and the clamping lever 10 are mounted directly to the tripod platform 2 and protrude from it. As another difference to the exemplary embodiment according to FIGS. 1 through 3, the device plate 6 is designed circularly, as particularly discernible from FIG. 6.

What is claimed is:

1. A leveling instrument—clamping device for mounting leveling instruments to a tripod platform of a tripod, which comprises: a device plate which can be mounted to the bottom of the leveling instrument; a stop provided on the top of the tripod platform; and a clamping device provided at a distance from the stop, with the device plate being fixed in a detachable manner on the tripod platform by means of the stop and the clamping device, wherein the device plate is provided in an open space between the stop and the clamping device and is fixed at the circumference.

2. A leveling instrument—clamping device according to claim 1, wherein the stop includes two pins protruding from the surface of the base plate.

3. A leveling instrument—clamping device according to claim 2, wherein said pins taper towards the surface of the base plate and wherein the device plate is correspondingly provided with a slope at the lateral circumference thereof by which the device plate interlocks with the pins.

4. A leveling instrument—clamping device according to claim 3, wherein a clamping lever is provided with a sloped area at the lateral circumference thereof, which corresponds to said slope at the circumference of the device plate and with which it interlocks during clamping.

5. A leveling instrument—clamping device according to claim 2, wherein said clamping device includes a clamping lever which includes a cam lever.

6. A leveling instrument—clamping device according to claim 1, wherein said clamping device includes as a clamping lever which is pivotable around an axis perpendicular to the surface of the tripod platform.

7. A leveling instrument—clamping device according to claim 1, wherein the stop and the clamping device are provided on a base plate, which is connectable to the tripod platform.

8. A leveling instrument—clamping device according to claim 7, wherein said base plate is connected to the tripod platform.

9. A leveling instrument—clamping device according to claim 7, wherein the base plate is mounted by means of a retaining bolt from the bottom of the tripod platform.

10. A leveling instrument—clamping device according to claim 1, wherein the device plate can be bolted into the bottom of the leveling instrument.

11. A leveling instrument—clamping device according to claim 10, wherein the device plate is provided with a threaded pin, which can be screwed into a thread at the bottom of the leveling instrument.

* * * * *